United States Patent
Nothum et al.

(10) Patent No.: US 7,533,769 B2
(45) Date of Patent: May 19, 2009

(54) POWDER COATING PROCESS AND SYSTEM

(75) Inventors: Stefan Nothum, Nufringen (DE); Klaus Schoenhardt, Nufringen (DE)

(73) Assignee: Hansa Metallwerke AG, Stuttgart (DE)

( * ) Notice: Subject to any disclaimer, the term of this patent is extended or adjusted under 35 U.S.C. 154(b) by 334 days.

(21) Appl. No.: 11/527,776

(22) Filed: Sep. 25, 2006

(65) Prior Publication Data

US 2007/0068771 A1   Mar. 29, 2007

(30) Foreign Application Priority Data

Sep. 24, 2005   (DE) .................. 10 2005 045 818

(51) Int. Cl.
B65G 29/00   (2006.01)

(52) U.S. Cl. .............. 198/463.1; 198/377.1; 198/619; 198/690.1

(58) Field of Classification Search ........... 198/377.01, 198/377.05, 377.09, 377.1, 463.1, 574, 375, 198/802, 619, 690.1; 118/320, 322
See application file for complete search history.

(56) References Cited

U.S. PATENT DOCUMENTS

| | | | | |
|---|---|---|---|---|
| 3,296,999 A | * | 1/1967 | Gamble | 118/680 |
| 3,684,078 A | * | 8/1972 | Nielsen | 198/377.01 |
| 4,180,152 A | * | 12/1979 | Sefcik | 198/377.06 |
| 4,264,001 A | * | 4/1981 | Jensen et al. | 198/377.01 |
| 5,209,181 A | * | 5/1993 | Flood | 118/322 |
| 5,713,405 A | * | 2/1998 | Kashiwagi | 198/378 |
| 5,989,644 A | * | 11/1999 | Williams | 427/424 |
| 6,491,755 B1 | * | 12/2002 | Meinke | 118/320 |
| 2008/0236996 A1 | * | 10/2008 | Bausenwein et al. | 198/472.1 |

FOREIGN PATENT DOCUMENTS

| | | |
|---|---|---|
| DE | 15 56 675 A | 3/1970 |
| DE | 21 01 706 A | 7/1971 |
| DE | 23 28 354 A | 12/1973 |
| DE | 33 02 084 C2 | 7/1984 |
| DE | 39 15 556 A1 | 11/1989 |
| DE | 38 17 543 A1 | 12/1989 |
| DE | 42 06 467 A1 | 9/1993 |
| DE | 43 41 166 C2 | 6/1994 |
| DE | 43 23 490 A1 | 1/1995 |
| DE | 201 10 420 U1 | 8/2001 |
| DE | 102 49 999 | 4/2004 |

OTHER PUBLICATIONS

German Office Action dated May 30, 2006 (German language).

* cited by examiner

*Primary Examiner*—Gene Crawford
*Assistant Examiner*—William R Harp
(74) *Attorney, Agent, or Firm*—Factor & Lake, Ltd.

(57) ABSTRACT

A system and method is described for treating workpieces, in particular vehicle wheels, especially in the context of a powder coating process, with a conveying device that guides the workpieces along a movement path through the arrangement. The conveying device comprises a conveyor. The workpieces can be arranged on spindle-shaped elements that are secured to the conveyor and that are rotatable about their own axis. The conveyor device comprises at least one means for generating a spatially and/or temporally altering magnetic field, which produces a force to rotate or stop the spindle-shaped elements.

19 Claims, 5 Drawing Sheets

POWDER COATING PROCESS AND SYSTEM

RELATED APPLICATIONS

The present invention claims the benefit of the filing date of German Patent Application, Serial No. 10 2005 045 818.1-22, filed Sep. 24, 2005; the content of which is incorporated by reference herein.

TECHNICAL FIELD

The invention relates to an arrangement for treating workpieces, in particular vehicle wheels, especially in the context of a powder coating process, with a conveying device that guides the workpieces along a movement path through the arrangement, wherein the conveying device comprises a conveyor and the workpieces can be arranged on spindle-shaped elements that are secured to the conveyor and that can rotate about their own axis.

BACKGROUND OF THE INVENTION

From DE 102 49 999 B3 an arrangement is known for lifting under suction specific surface regions of powder coated vehicle wheels, which comprises a conveying device that guides the vehicle wheels along a movement path through the arrangement. The vehicle wheels can be mounted on spindles that are secured to a conveyor of the conveying device and can rotate about their own axis.

In order to rotate spindles of this type rotation stations in the form of interlocking drive means, for example chain drives, are known, in which the spindles have in each case a sprocket wheel disc that engages in a chain of the rotation station. The engagement of the sprocket wheel in the chain is of course subject to a great deal of wear. Also, sharp sudden transitions during the engagement of the sprocket wheel with the chain cause an impact loading of the conveying device and of the workpieces, in particular the vehicle wheels, mounted on the spindles. Furthermore the engagement of the sprocket wheels in the chain limits realisable spindle rotational speeds to small values of between 0 rpm and about 35 rpm. Moreover, such rotation stations are maintenance-intensive, and in particular lubrication of the chain and the replacement of worn chains regularly has to be carried out. Apart from this, changes in rotational direction or rotational speed, if indeed possible, are difficult to accomplish and are complicated. A plurality of individual rotation stations with their own motors and a suitable configuration of the transition regions are necessary for this purpose. In critical areas of use, in which for example special protective measures have to be used as regards gas and/or dust explosions (explosion hazard regions), this is virtually impossible to realise.

SUMMARY OF THE INVENTION

The object of the present invention is to provide an arrangement of the type mentioned in the introduction in which a conveyance and a rotation of the workpieces can be realised in a technically simple and reliable manner.

This object if achieved according to the invention in that the conveying device comprises at least one means for generating a spatially and/or temporally changing magnetic field, which exerts a force to rotate or stop the spindle-shaped elements.

According to the invention the workpieces are rotatably driven in a completely contactless manner, in contrast to the known drive means, in particular while maintaining at least one air gap between the means for generating the magnetic field and the spindle-shaped elements, with the aid of the changing magnetic field. In this way the drive is effected in a virtually wear-free manner, with the result that the maintenance expenditure is also extremely low. Apart from this magnetic fields can be controlled and regulated as desired within wide limits, so that changes of rotational direction and rotational speed can be effected without any problems. It is therefore possible to sub-divide the movement path into individual function regions, in particular into acceleration stretches and deceleration stretches. Also, far larger spindle rotational speeds can be achieved than when using interlocking drive means.

Apart from this the movement of the spindle-shaped elements into the conveying device as well as a change of region can take place very smoothly, so that the conveying device and the workpieces are not subjected to any impact loads. Furthermore the use in critical regions, in particular explosion hazard regions, is less problematical than in the known rotation stations, since on account of the contactless drive there is no frictional heat or formation of sparks due to impacting metal parts, for example sprockets on chains. Moreover the material from which the spindle-shaped elements are fabricated can be freely chosen within wide limits. For example, soft materials such as aluminium can also be used, which in the case of an interlocking drive means would be subjected to a large degree of wear. Also, the spatial orientation of the arrangement is irrelevant, and for example the movement path of the conveying device and the rotational axes of the spindle-shaped elements may run horizontally or vertically.

Advantageously the magnetic field can have the shape of a wave travelling along the movement path. In this way a particularly gentle and smooth drive for the rotational movement of the spindle-shaped elements can be achieved.

Conveniently the means along the movement path may comprise a plurality of electrical coil elements, in particular electromagnets, for generating the magnetic field. These can easily be controlled and can also be operated in a robust and maintenance-free manner.

In a particularly advantageous embodiment the electrical coil elements can be connected to one another in at least two groups and can be arranged alternately along the movement path, the electrical coil elements being able to be charged in groups with alternating currents that are phase shifted with respect to one another. In this way a magnetic field in the form of a travelling wave can be generated particularly easily.

In order to effect a uniform spatial behaviour of the magnetic field, the electrical coil elements may be arranged equidistantly along the conveyor.

The electrical coil elements may be arranged on one side or both sides of the conveyor. In this way different classes of power output can easily be realised. In order to generate small magnetic fields and therefore small torques, for example for rotating light workpieces, an arrangement of electrical coil elements on one side of the conveyor is sufficient. Larger magnetic fields can be obtained by a bilateral arrangement of the electrical coil elements.

The means for generating the magnetic field may be controllably connected to a control device, in particular to a frequency converter, by means of which the time behaviour and/or the strength of the magnetic field can easily be altered.

Conveniently the means for generating the magnetic field may be functionally connected to a three-phase current source or to a regulated direct current source. A temporally changing magnetic field corresponding to the behaviour of the excitation current can be generated with little control and/or regulation effort using the three-phase current source or the regulated direct current source.

In a further particularly advantageous embodiment the spindle-shaped elements may in each case comprise a part, in particular a spindle carrier, fixedly connected to the conveyor, and a part, in particular a spindle shaft, rotatably mounted thereon. The simple construction of the spindle-shaped elements with few structural parts permits a rapid installation with only a small amount of adjustment work, and a reliable, low-maintenance operation.

Advantageously the rotatably mounted part, in particular the spindle shaft, may comprise an in particular circular disc (spindle disc), which at least in part is made of an electrically conducting material, in particular of metal, which part can be secured in a rotationally fixed manner to the rotationally mounted part. The spindle disc may in particular be of steel, iron, aluminium, copper or an alloy. The changing magnetic field can generate eddy currents particularly easily in the spindle disc.

In order to ensure a uniform rotation of the spindle-shaped elements, the spindle disc may be arranged concentrically to the rotational axis of the spindle and with the plane of the disc perpendicular to the rotational axis of the spindle.

Depending on the magnitude of the desired magnetic field, the means for generating the magnetic field, in particular the electrical coil elements, are arranged on one or both sides of the circular spindle discs or surround the said spindle discs in the shape of a horseshoe.

The conveyor may run continuously or in a pulsed manner. This has the advantage that the arrangement can be used for different, continuously operating as well as pulsed treatments, for example when treatment stations arranged along the movement path are employed. The control of the means for generating the magnetic field can be adapted to the control of the conveyor, so that also in the case of a simultaneous translational conveyance of the spindle-shaped elements along the movement path, these can be rotated reliably and in a controlled manner.

BRIEF DESCRIPTION OF THE DRAWINGS

Embodiments of the invention are described in more detail hereinafter with the aid of the drawings, in which.

DETAILED DESCRIPTION OF THE PRESENT INVENTION

Figure 1:
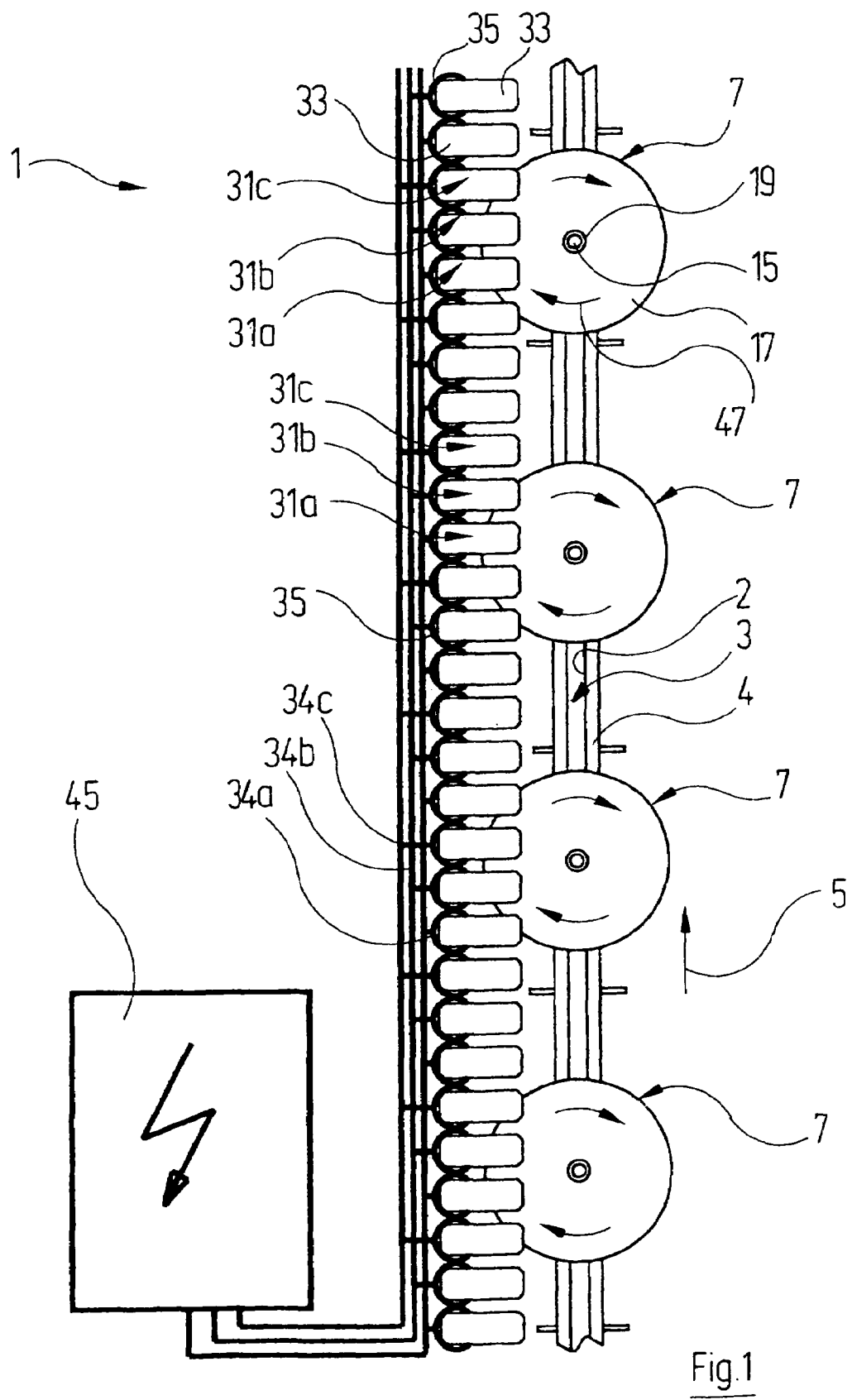
FIG. 1 shows diagrammatically a plan view of a first embodiment of a conveying device of an arrangement for treating vehicle wheels within the context of a powder coating process, with spindles for holding the vehicle wheels, which spindles are secured to an endless flat link articulated chain of a conveyor and can rotate about their own axis, and with electromagnets with horseshoe-shaped cores for generating a variable magnetic field along a movement path, which field exerts a force to rotate or stop the vehicle wheels.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows diagrammatically a plan view of a first embodiment of a conveying device, identified overall by the reference 1, of an otherwise not illustrated arrangement for treating vehicle wheels within the context of a powder coating process. The conveying device 1 guides the vehicle wheels along a movement path through the arrangement.

The conveying device 1 comprises an endless flat link articulated chain 2, running vertically in FIG. 1, of a conveyor 3. The endless flat link articulated chain 2 is installed in a longitudinally extended spindle guide housing 4, only a section of which is shown in FIG. 1, which has a roughly C-shaped profile, upwardly open in the lateral partial section in FIG. 2. The spindle guide housing 4 has at its back, at the foot of FIG. 2, an upwardly open chain guide 6, likewise with a C-shaped profile, in which the endless flat link articulated chain 2 is guided. The endless flat link articulated chain 2 is driven via drive units (not shown) in the direction of an arrow 5 (conveying direction), from the bottom to the top in FIG. 1, along the movement path.

Figure 2:
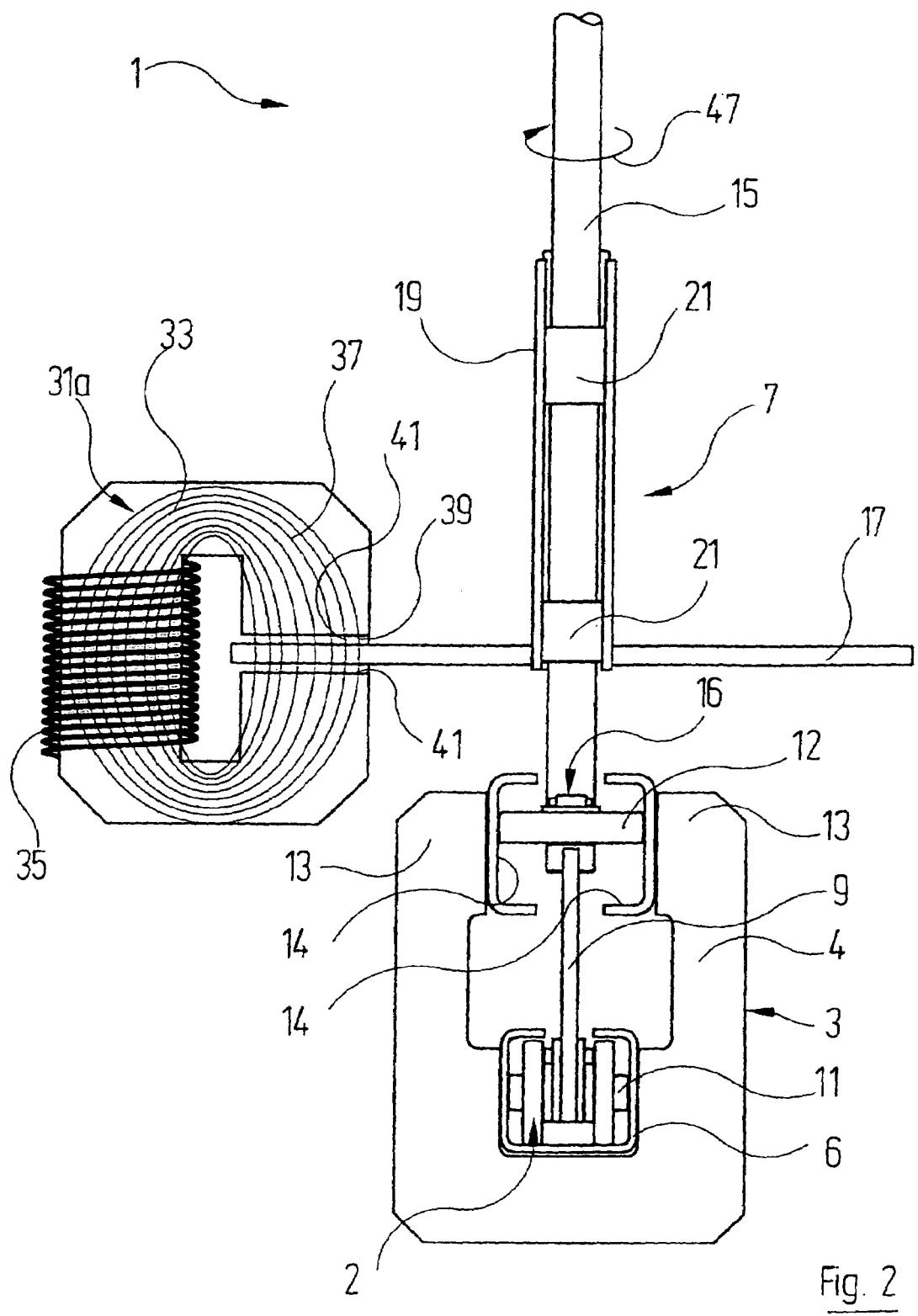
FIG. 2 shows diagrammatically a vertical partial section of the conveying device of FIG. 1 in the region of one of the spindles and one of the electromagnets perpendicular to the movement direction.

A plurality of substantially identical spindles 7 for receiving the vehicle wheels are secured to the endless flat link articulated chain 2, one of which spindles is shown by way of example in a vertical partial section in FIG. 2.

The spindles 7 have in each case a circular cylindrical shaped spindle carrier 9, the axis of which forms a spindle axis or rotation. The lower end of the spindle carrier 9 in FIG. 2 is secured to a bolt 11 of the endless flat link articulated chain 2 so that the axis of the spindle carrier 9 is perpendicular to the axis of the bolt 11. The end of the spindle carrier 9 facing away from the endless flat link articulated chain 2 is guided via a guide roller 12 in a double-C-profile guide 14, which is firmly secured between the sides 13 of the C-shaped spindle guide housing 4.

Also, a spindle shaft 15 of the spindle 7 is mounted coaxially to the axis of rotation of the spindle on the end of the spindle carrier 9 facing away from the endless flat link articulated chain 2 and can rotate about the spindle in a bearing 16.

A circular spindle disc 17 of steel has a through-opening in the middle. A tubular sleeve 19 is inserted through this opening and fixed in such a way that the axis of the sleeve 19 runs perpendicular to the plane of the disc and one of its front faces terminates roughly with one of the surfaces of the disc. The internal diameter of the sleeve 19 is somewhat larger than the external diameter of the spindle shaft 15. Two press rings 21 are arranged spaced apart at the top and bottom in the interior of the sleeve 19. The sleeve 19 is placed on the spindle shaft 15, with its end containing the spindle disc 17 facing towards the spindle carrier 9. The sleeve 19 is secured with the press rings 21 via a press-fit connection to the spindle shaft 15. The spindle disc 17 is arranged in this way concentrically to the axis of rotation of the spindle and with the plane of the disc perpendicular to the rotational axis of the spindle.

A region of the spindle shaft 15 facing away from the spindle carrier 9, and not visible in FIGS. 1 and 2, is guided with a synchronising device (not shown) along the movement path.

A vehicle wheel (not shown) can be arranged concentrically on the top of the spindle shaft 15.

In order to rotate the spindle shafts 15 and thus the vehicle wheels or to stop a rotation of the latter, the conveying device 1 comprises a plurality of identical electromagnets 31a, 31b and 31c with horseshoe-shaped cores 33. The electromagnets 31a, 31b and 31c are secured on one side, on the left hand side in FIG. 1, equidistantly along the endless flat link articulated chain 2 to a holding device (not shown) separated from the endless flat link articulated chain 2.

The two front faces 41 at the ends of the cores 33 of each electromagnet 31a, 31b, 31c run parallel, so that an air gap 39 remains between them. The regions of the cores 33 lying opposite the ends are surrounded in each case by a coil 35. If a current flows through the respective coil 35, the air gap 39 is then permeated by a magnetic field. The magnetic fields of all electromagnets 31a, 31b, 31c add to form a resultant magnetic field 37, which extends along the endless flat link articulated chain 2.

The electromagnets 31a, 31b and 31c are oriented so that their air gaps 39 lying between the sides of the horseshoe are on the side facing towards the endless flat link articulated chain 2. The front faces 41 of the cores 33 run horizontally parallel to the spindle discs 17, the said spindle discs 17 penetrating with a part of their radially outwardly lying regions into the air gaps 39 of a plurality of adjacently lying cores 33 of electromagnets 31a, 31b, 31c. When the spindles 7 are transported in the movement direction 5 the spindle discs 17 can pass in a contactless manner through the air gaps 39 of all electromagnets 31a, 31b and 31c identically arranged behind one another when viewed in the direction of the endless flat link articulated chain 2, the discs being exposed in particular in the regions of the air gaps 39 to the magnetic field 37 prevailing there. The spindle discs 17 are guided in this way with their outer region in a contactless manner through the air gaps 39 between the two front faces 41 of the horseshoe-shaped cores 33.

Each spindle disc 17 is always surrounded by at least three electromagnets 31a, 31b and 31c along the movement path, except when entering and leaving the arrangement of the electromagnets 31a, 31b and 31c; in the example of FIG. 1 there are four such electromagnets. When current flows through the coils 35 of the electromagnets 31a, 31b and 31c, the magnetic field 37 generated by them passes through the spindle disc 17, the field lines of the magnetic field running substantially parallel to the axes of rotation of the spindles.

The electromagnets 31a, 31b and 31c are connected up to form three groups of electromagnets lying parallel to one another and arranged alternately in a uniform sequence along the movement path. Alternately means that in the movement direction 5 an electromagnet 31a of the first group is followed by an electromagnet 31b of the second group and this is followed by an electromagnet 31c of the third group and then in turn by an electromagnet 31a of the first group, and so on. Each group of electromagnets 31a, 31b and 31c is connected respectively via a supply line 34a, 34b and 34c to one of three phases of a three-phase current source 45, shown at bottom left in FIG. 1. The electromagnets are thus supplied with current in each case phase-shifted by 120°. Overall a resultant magnetic field 37 changing spatially along the endless flat link articulated chain 2 and which has the shape of a travelling wave is generated from the temporally changing individual magnetic fields of the individual electromagnets 31a, 31b and 31c.

This resultant magnetic field 37 travelling relative to the flat link articulated chain 2 and changing along the movement path generates eddy currents in the spindle discs 17 in such a way that a force acts transversely to the magnetic field 37 and thus produces a resultant torque on the spindle discs 17, which are rotated clockwise around the axes of rotation of the spindles in the direction of the arrow 47. Due to a corresponding change of the current direction and/or of the phase shift and of the resultant torques acting on the spindle discs 17, the rotations of the said spindle discs 17 can be stopped.

Moreover, the endless flat link articulated chain 2 runs continuously and moves the spindles 7 in the movement direction 5 past the electromagnets 31a, 31b and 31c, their spindle discs 17 penetrating, as already mentioned, into the air gaps 39 of the electromagnets 31a, 31b and 31c. When controlling the current supply to the electromagnets 31a, 31b and 31c the progressive movement of the spindles 7 is taken into account in such a way that a magnetic field 37 necessary for the controlled rotation of the spindle discs 17 is achieved. The rotational speed is in this connection a function of the frequency of the excitation voltages.

Figure 3:
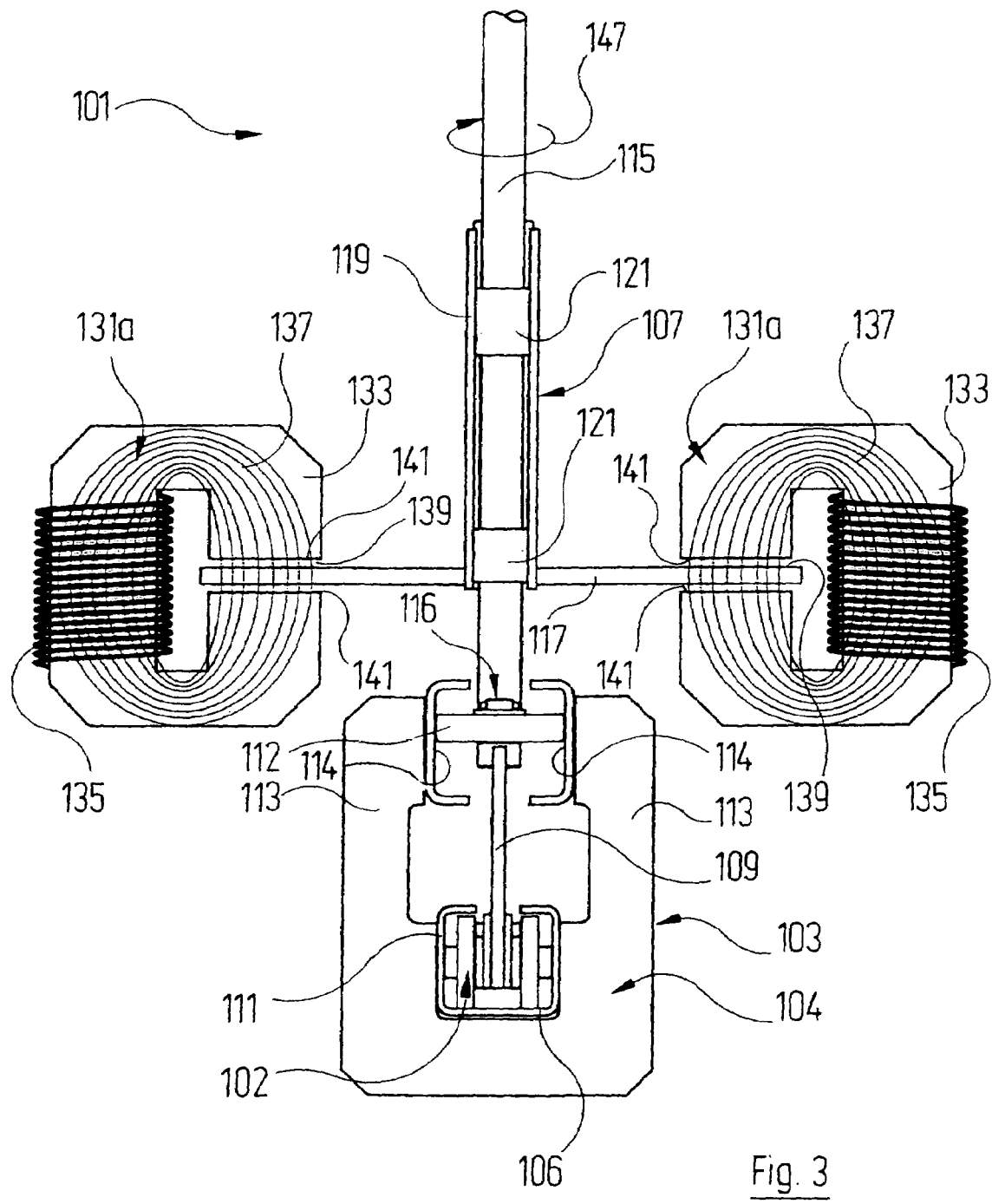
FIG. 3 shows diagrammatically a vertical partial section of a second embodiment of a conveying device similar to the conveying device of FIGS. 1 and 2, with electromagnets with horseshoe-shaped cores arranged on both sides of the spindles, in this case in the region of one of the spindles.

FIG. 3 shows a vertical partial section of a second embodiment of a conveying device 101 similar to the first embodiment of FIGS. 1 and 2, in the region of one of the spindles 107. Those elements that are similar to the corresponding elements of the first embodiment are provided with the same reference numerals plus 100, so that they can be described by referring to the relevant descriptions in the first embodiment. In contrast to the first embodiment, in the second embodiment electromagnets 131a with horseshoe-shaped cores 133 are arranged not on one side but in a mirror symmetrical manner on both sides of the spindles 107, simply two electromagnets 131a being shown in FIG. 3. The electromagnets 131a are connected, corresponding to the first embodiment, to electromagnets (not visible in FIG. 3) corresponding to the electromagnets 31b and 31c of the first embodiment in FIGS. 1 and 2, in such a way that the forces produced by them always act together in an optimum manner on the spindle discs 117 so that the desired effect, namely a controlled rotation of the spindle discs 117, spindle shafts 115 and vehicle wheels mounted thereon, or stopping of the rotation, is achieved.

Figure 4:
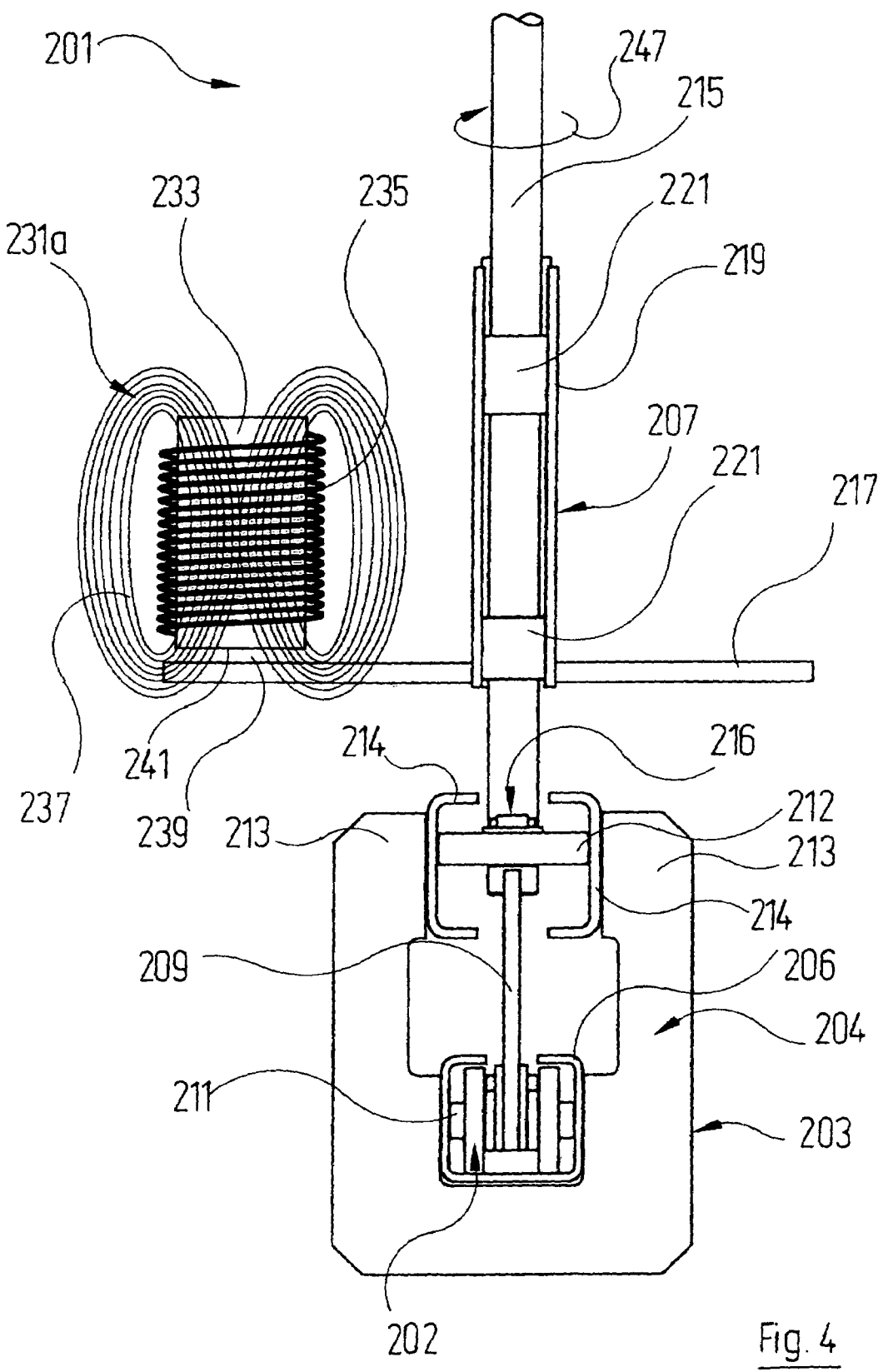
FIG. 4 shows diagrammatically a vertical partial section of a third embodiment of a conveying device similar to the conveying device of FIGS. 1 and 2, with electromagnets with straight cores arranged on one side of the spindles, in this case in the region of one of the spindles; and, FIG. 5 shows diagrammatically a vertical partial section of a fourth embodiment of a conveying device similar to the conveying device of FIGS. 1 and 2, with two electromagnets with straight cores arranged in pairs on one side of the spindle, in this case in the region of one of the spindles.

FIG. 4 shows a vertical partial section of a third embodiment of a conveying device 201 in the region of one of the spindles 207, similar to the conveying device 1 described in connection with FIGS. 1 and 2. Those elements that are similar to the corresponding elements of the first embodiment are provided with the same reference numerals plus 200, so that they can be described by referring to the relevant descriptions in the first embodiment. In contrast to the first embodiment the electromagnets 231a, simply one electromagnet 231a of which is shown in FIG. 4, do not have a horseshoe-shaped core but instead a straight core 233. The electromagnets corresponding to the electromagnets 31b and 31c of the first embodiment in FIGS. 1 and 2 are not shown in FIG. 4. The electromagnets 231a are situated on the side of the spindle disc 217 facing away from the endless flat link articulated chain 202. The axes of their cores 233 run parallel to the axes of rotation of the spindles. The electromagnets 231a are arranged so that in each case an air gap 239 remains between the front faces 241 of their cores 233 facing towards the spindle disc 217 and the corresponding surfaces of the spindle discs 217, and the cores 233 of the electromagnets 231a do not touch one another. The magnetic fields 237 of the electromagnets 231a, through the coils 235 of which current flows, in this case too, corresponding to the first embodiment, permeate the spindle discs 217 and produce corresponding torques to rotate or stop the spindle shafts 215 with the spindle disc 217 and the vehicle wheels mounted thereon.

Figure 5:
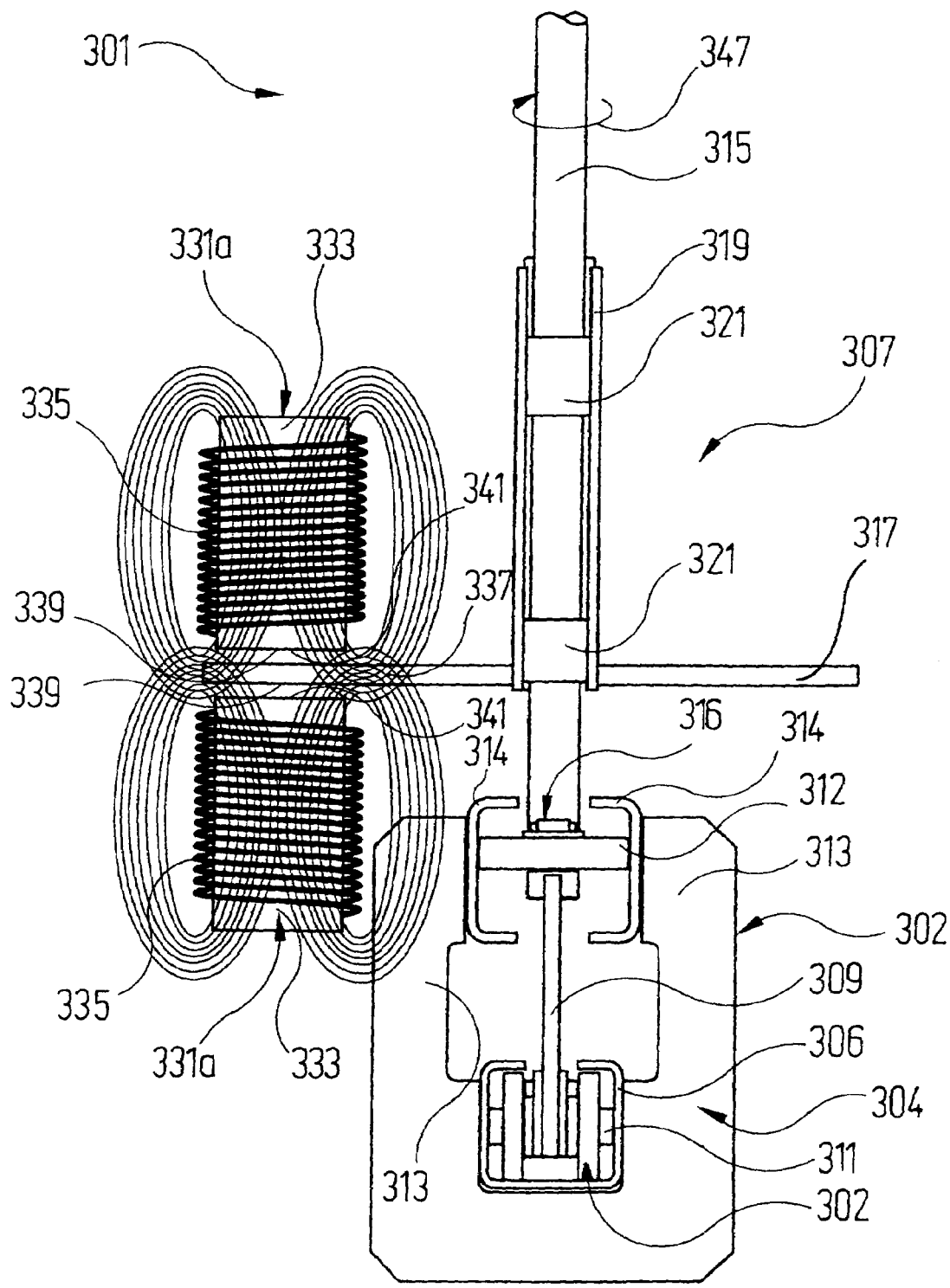

In a fourth embodiment, shown in FIG. 5, those elements that are similar to the corresponding elements of the third embodiment described with reference to FIG. 4 are provided with the same reference numerals plus 100, so that as regards their description reference may be made to the description relating to the third embodiment. This embodiment differs from the third embodiment in that, in addition to the upper electromagnets 331a on the side of the spindle discs 317 facing away from the endless flat link articulated chain 302, a substantially symmetrical arrangement of lower electromagnets 331a on the oppositely lying side of the spindle discs 317 facing towards the endless flat link articulated chain 302 is provided. In this case a lower electromagnet is paired with each upper electromagnet 331a, the axes of the cores 333 of the paired electromagnets 331a running coaxially. Between the front sides 341, in each case facing towards the spindle disc 317, of the cores 333 of the upper and lower electromagnets 331a and the corresponding surface of the spindle disc 317 there is in each case an air gap 339, through which the circumferential regions of the spindle discs 317 pass in a contactless manner during transportation along the movement path. The oppositely lying paired electromagnets 331a are connected up in groups corresponding to the first embodiment of FIGS. 1 and 2, so that the individual magnetic fields generated by them combine to produce the resultant magnetic field 337 with larger field strengths particularly in the region of the spindle discs 317, and accordingly correspondingly larger torques act on the spindle discs 317 and thus on the spindle shafts 315 and vehicle wheels. In this way also heavy vehicle wheels can be rotated at high speeds.

Instead of vehicle wheels, the arrangement can also be used to treat other workpieces. Also, the use of the arrangement is not restricted to powder coating processes.

Instead of the electromagnets 31a, 31b, 31c; 131a; 231a; 331a, at least one other means for generating the magnetic field 37; 137; 237; 337 may also be provided, in particular a plurality of electrical coil elements.

The electromagnets 31a, 31b, 31c; 131a; 231a; 331a may also be arranged in another way.

The electromagnets 31a, 31b, 31c; 131a; 231a; 331a instead of being connected up to one another in three groups, may also be connected up in some other way, including a smaller or larger number of groups. They may for example also be connected separately and suitably controlled with a control device, in particular a frequency converter.

The electromagnets 31, 31b, 31c; 131a; 231a, 331a, instead of being connected to a three-phased current source 45, may also be functionally connected to another varying current source, for example to a regulated direct current source.

By a suitable current flow through the coils 35; 135; 235; 335 of the electromagnets 31a, 31b, 31c; 131a; 231a; 331a, changes of direction of rotation and/or accelerations of the rotational movement may also be effected. The individual spindle discs 17; 117; 217; 317 together with the spindle shafts 15; 115; 215; 315 may also be rotated or stopped separately.

The spindle discs 17; 117; 217; 317 may be made of a metal other than steel, in particular of iron, aluminium or copper. They may however also be made of another electrically conducting material. They may also be constructed only at least in part of this material, and may for example be coated therewith or contain a core 33; 133; 233; 333 of such a material.

The spindle discs 17; 117; 217; 317, instead of being secured with the press ring, may also be secured in another way, in particular in a rotationally fixed manner, to or on the spindle shafts 15; 115; 215; 315.

The endless flat link articulated chain 2; 102; 202; 302 may also run in a pulsed manner instead of continuously.

Instead of the endless flat link articulated chain 2; 102; 202; 302, a different type of movable part of a conveyor, for example an endless belt, may also be provided.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

The invention claimed is:

1. A system for treating workpieces, utilizing a conveying device that guides the workpieces along a movement path through the system, wherein the conveying device comprises a conveyor and the workpieces are arranged on spindle-shaped elements that are secured to the conveyor and rotate about their own axis,
   wherein
   the conveying device further comprises at least one means for generating a spatially and/or temporally changing magnetic field, which exerts a force to rotate or stop the spindle-shaped elements.

2. The system according to claim 1, wherein the magnetic field has the shape of a wave travelling along the movement path.

3. The system according to claim 1, wherein a means along the movement path comprises a plurality of electrical coil elements, for generating the magnetic field.

4. The system according to claim 3, wherein the electrical coil elements are connected to one another in at least two groups and are arranged alternately along the movement path, the electrical coil elements being charged in groups with alternating electrical currents that are phase-shifted with respect to one another.

5. The system according to claim 3, wherein the electrical coil elements are arranged equidistantly along the conveyor.

6. The system according to claim 3, wherein the electrical coil elements are arranged on one side or both sides of the conveyor.

7. The system of claim 3, wherein the plurality of electrical coil elements include electromagnets.

8. The system according to claim 1, wherein the means for generating the magnetic field is controllably connected to a control device.

9. The system of claim 8, wherein the control device includes a frequency converter.

10. The system according to claim 1, wherein the means for generating the magnetic field is functionally connected to a three-phase current source or to a source for regulated direct current.

11. The system according to claim 1, wherein the spindle-shaped elements in each case comprise a part securely connected to the conveyor and a part rotatably mounted thereon.

12. The system according to claim 11, wherein the rotatably mounted part comprises a circular disc that is formed at least in part of an electrically conducting material which is secured in a rotationally fixed manner to the rotatably mounted part.

13. The system according to claim 12, wherein the circular disc is arranged concentrically with respect to the axis of rotation of the spindle and with the plane of its disc perpendicular to the axis of rotation of the spindle.

14. The system according to claim 12, wherein the means for generating the magnetic field are arranged on one or both sides of the circular spindle discs, or surround the spindle discs in the manner of a horseshoe.

15. The system of claim 12, wherein the electrically conducting material includes metal.

16. The system of claim 11, wherein the part securely connected to the conveyor is a spindle carrier.

17. The system of claim 11, wherein the part rotatably mounted is a spindle shaft.

18. The system of claim 17, wherein the part securely connected to the conveyor is a spindle carrier.

19. The system according to claim 1, wherein the conveyor runs continuously or in a pulsed manner.

\* \* \* \* \*

UNITED STATES PATENT AND TRADEMARK OFFICE
CERTIFICATE OF CORRECTION

PATENT NO. : 7,533,769 B2
APPLICATION NO. : 11/527776
DATED : May 19, 2009
INVENTOR(S) : Nothum et al.

It is certified that error appears in the above-identified patent and that said Letters Patent is hereby corrected as shown below:

On the Title Pg:

Item (73) Assignee        Assignee should read: Eisenmann Anlagenbau GmbH & Co. KG instead of Hansa Metallwerke AG.

Signed and Sealed this

Nineteenth Day of January, 2010

David J. Kappos
*Director of the United States Patent and Trademark Office*